(12) United States Patent
Schauser et al.

(10) Patent No.: US 9,582,345 B2
(45) Date of Patent: Feb. 28, 2017

(54) SYSTEMS AND METHODS FOR IMPORTING DATA FROM DATA SOURCES OVER A NETWORK WHILE CORRECTING AND TRANSFORMING THE DATA

(75) Inventors: Klaus Schauser, Goleta, CA (US);
Fredrik Valeur, Carpinteria, CA (US);
Jerry Zheng, Santa Barbara, CA (US);
Tushar Ranka, Ventura, CA (US);
Donald Tognazzini, Santa Barbara, CA (US)

(73) Assignee: Appfolio, Inc., Goleta, CA (US)

( * ) Notice: Subject to any disclaimer, the term of this patent is extended or adjusted under 35 U.S.C. 154(b) by 961 days.

(21) Appl. No.: 12/637,121

(22) Filed: Dec. 14, 2009

(65) Prior Publication Data
US 2011/0145636 A1    Jun. 16, 2011

(51) Int. Cl.
*G06F 11/07* (2006.01)

(52) U.S. Cl.
CPC ...... *G06F 11/0709* (2013.01); *G06F 11/0763* (2013.01); *G06F 11/0793* (2013.01); *G06F 11/0751* (2013.01)

(58) Field of Classification Search
CPC ............. G06F 11/0709; G06F 11/0793; G06F 11/0763; G06F 11/0751
USPC ...................................... 714/15, 21; 707/809
See application file for complete search history.

(56) References Cited

U.S. PATENT DOCUMENTS

| | | | |
|---|---|---|---|
| 6,385,606 B2 * | 5/2002 | Inohara et al. | 707/702 |
| 7,085,953 B1 * | 8/2006 | Hsu et al. | 714/5.11 |
| 7,412,464 B2 * | 8/2008 | Fienblit et al. | |
| 7,444,360 B2 * | 10/2008 | Frondozo et al. | |
| 7,490,207 B2 * | 2/2009 | Amarendran et al. | 711/165 |
| 7,549,089 B1 * | 6/2009 | Kimmel et al. | 714/42 |
| 7,685,378 B2 * | 3/2010 | Arakawa et al. | 711/154 |
| 7,702,698 B1 * | 4/2010 | Chakravarthy | 707/804 |
| 7,752,489 B2 * | 7/2010 | Deenadhayalan et al. | 714/6.12 |
| 7,856,583 B1 * | 12/2010 | Smith | 714/746 |
| 7,873,878 B2 * | 1/2011 | Belluomini et al. | 714/52 |
| 8,175,110 B2 * | 5/2012 | Suzuki | 370/465 |
| 2006/0107096 A1 * | 5/2006 | Findleton et al. | 714/6 |
| 2007/0011205 A1 * | 1/2007 | Majjasie et al. | 707/104.1 |
| 2011/0137859 A1 * | 6/2011 | Dickman | 707/610 |

OTHER PUBLICATIONS

Wikipedia's Storage Area Network revision from Dec. 12, 2009 http://en.wikipedia.org/w/index.php?title=Storage_area_network&oldid=331236857.*

(Continued)

*Primary Examiner* — Joseph Schell
(74) *Attorney, Agent, or Firm* — Foley & Lardner LLP; John D. Lanza

(57) ABSTRACT

Systems and methods for importing data from data sources over a network while correcting and transforming the data are described. A data migration server receives data from various data sources. The data migration server repairs and transforms the received data before transmitting the data to a new data server. In some embodiments, the data migration server repairs data before formatting the data, and in other embodiments, the data migration server formats data before repairing the data. The data migration server also verifies the accuracy of the data, either by comparing the data against data requested and received from third-party servers or in reference to other data from the data sources.

30 Claims, 9 Drawing Sheets

(56) References Cited

OTHER PUBLICATIONS

Wikipedia's Transmission Control Protocol version from Dec. 13, 2009 http://en.wikipedia.org/w/index.php?title=Transmission_Control_Protocol&oldid=331408940.*

* cited by examiner

SYSTEMS AND METHODS FOR IMPORTING DATA FROM DATA SOURCES OVER A NETWORK WHILE CORRECTING AND TRANSFORMING THE DATA

FIELD OF THE INVENTION

The present invention relates to systems and methods for importing data from data sources, including data sources, over a network while correcting and transforming the data.

BACKGROUND OF THE INVENTION

Data management capabilities conventionally provided by software for installation on computing systems have increasingly become available via web-based services. When users create accounts with Software as a Service (SaaS) providers, the users often migrate data from other environments into the new accounts. For example, the users may migrate data stored on their computing systems or data currently stored in accounts with other SaaS providers. Additionally, users may upgrade their accounts, which may result in transfer of data within the SaaS provider's system. However, when migrating data from any source into a new data management system, numerous problems may arise. The data may have been poorly maintained, containing inaccuracies ranging from typographical errors and misspellings to outdated information, erroneous calculations, and incomplete records. The data may be organized in a format incompatible with the selected data management system. Because of the variety of data formats and uncertain quality of data, formatting, verifying, and correcting data to migrate can be a time consuming and expensive procedure, one that users of conventional software would have had to undertaken when upgrading their software.

BRIEF SUMMARY OF THE INVENTION

Opting for Software as a Service (SAAS) over installation software to manage data shifts numerous administrative burdens conventionally assumed by the data owner to the service provider. The service provider may assume responsibility for initiating and transferring data from various data sources. The service provider may also take charge of repairing data, formatting data to be compatible with the service provider's infrastructure, and/or verifying the accuracy of data before entering the data into the user's account. As a result, a user may subscribe to and/or upgrade a service, and the service provider readies the data for use without disturbing the user.

In one aspect, the present invention relates to methods for repairing and migrating data from a data source over a network. In one embodiment, the method includes: receiving, by a server, a first data of a plurality of data stored in a first data source; performing, by the server, a first transformation upon the first data to repair the first data; storing in a memory element provided by the server the repaired first data; performing, by the server, a second transformation upon the repaired first data to format the repaired first data; and transmitting, by the server, the repaired and formatted first data to a new data server.

In some embodiments, the first and second transformations may be determined according to a set of rules. In more embodiments, the second transformation may format the repaired first data into an intermediate format. In additional embodiments, the method may also include receiving, by the server, a second data of a plurality of data stored in a second data source; and performing, by the server, a third transformation different from the second transformation upon the second data to format the second data into the intermediate format. In various embodiments, the method may also include performing, by the server, a fourth transformation upon the first and second data in the intermediate format to format the first and second data into a final format; and transmitting, by the server, to the new data server the first and second data in the final format. In many embodiments, the method may include grouping the first data with other data stored in the memory element provided by the server; transmitting, by the server, information according to the data in the group to a second server to verify the accuracy of the data in the group; receiving, by the server, a response from the second server indicating the accuracy of the data; and correcting, by the server, at least one data in the group according to the response. In some embodiments, the method may include retrieving, by the server, a second data from the plurality of data that is stored in the memory element according to the first data; performing, by the server, an operation upon the first and second data to determine the accuracy of the first data; and correcting, by the server, the first data according to the determination.

In another aspect, the present invention relates to methods for repairing and migrating data from a data source over a network. In one embodiment, the method includes: receiving, by a server, a first data of a plurality of data stored in a first data source; performing, by the server, a first transformation upon the first data to format the first data; storing in a memory element provided by the server the formatted first data; performing, by the server, a second transformation upon the formatted first data to repair the formatted first data; and transmitting, by the server, the formatted and repaired first data to a new data server.

In some embodiments, the first and second transformations may be determined according to a set of rules. In many embodiments, the first transformation may format the first data into an intermediate format. In various embodiments, the method may also include receiving, by the server, a second data of a plurality of data stored in a second data source; and performing, by the server, a third transformation different from the first transformation upon the second data to format the second data into the intermediate format. In further embodiments, the method may include performing, by the server, a fourth transformation upon the first and second data in the intermediate format to format the first and second data into a final format; and storing in the memory element provided by the server the first and second data in the final format. In various embodiments, the method may include grouping the first data with other data stored in the memory element provided by the server; transmitting, by the server, information according to the data in the group to a second server to verify the accuracy of the data in the group; receiving, by the server, a response from the second server indicating the accuracy of the data; and correcting, by the server, at least one data in the group according to the response. In many embodiments, the method may include retrieving, by the server, a second data from the plurality of data that is stored in the memory element according to the first data; performing, by the server, an operation upon the first and second data to determine the accuracy of the first data; and correcting, by the server, the first data according to the determination.

In another aspect, the present invention relates to computer implemented systems for repairing and migrating data from at least one data source over a network. In one embodiment, the system includes: a transceiver that receives a first data of a plurality of data stored in a first data source and transmits repaired and formatted first data to a new data server; a first transformation engine that performs a first transformation upon the first data to repair the first data; a second transformation engine that performs a second transformation upon the repaired first data to format the repaired first data; and a memory element that stores the repaired first data or the repaired and formatted first data.

In many embodiments, the second transformation may format the repaired first data into an intermediate format. In various embodiments, the system may include a third transformation engine that performs a third transformation different from the second transformation upon second data from a second data source to format the second data into the intermediate format. In additional embodiments, the system may include a fourth transformation engine that performs a fourth transformation upon the first and second data in the intermediate format to format the first and second data into a final format, wherein the first and second data in the final format are stored in the memory element. In some embodiments, the system may include a processor that groups the first data with other data stored in the memory element, transmits information according to the data in the group to a server to verify the accuracy of the data in the group, receives a response from the second server indicating the accuracy of the data and corrects at least one data in the group according to the response. In many embodiments, the system may include a processor that retrieves a second data from the plurality of data that is stored in the memory element according to the first data, performs an operation upon the first and second data to determine the accuracy of the first data, and corrects the first data according to the determination.

In another aspect, the present invention relates to computer implemented systems for repairing and migrating data from at least one data source over a network. In one embodiment, the system includes: a transceiver that receives a first data of a plurality of data stored in a first data source and transmits formatted and repaired first data to a new data server; a first transformation engine that performs a first transformation upon the first data to format the first data; a second transformation engine that performs a second transformation upon the formatted first data to repair the formatted first data; and a memory element that stores the formatted first data or the formatted and repaired first data.

In some embodiments, the first transformation may format the first data into an intermediate format. In various embodiments, the system may include a third transformation engine that performs a third transformation different from the first transformation upon second data from a second data source to format the second data into the intermediate format. In additional embodiments, the system may include a fourth transformation engine that performs a fourth transformation upon the first and second data in the intermediate format to format the first and second data into a final format, wherein the first and second data in the final format are stored in the memory element. In many embodiments, the system may include a processor that groups the first data with other data stored in the memory element, transmits information according to the data in the group to a server to verify the accuracy of the data in the group, receives a response from the second server indicating the accuracy of the data and corrects at least one data in the group according to the response. In numerous embodiments, the system may include a processor that retrieves a second data from the plurality of data that is stored in the memory element according to the first data, performs an operation upon the first and second data to determine the accuracy of the first data, and corrects the first data according to the determination.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
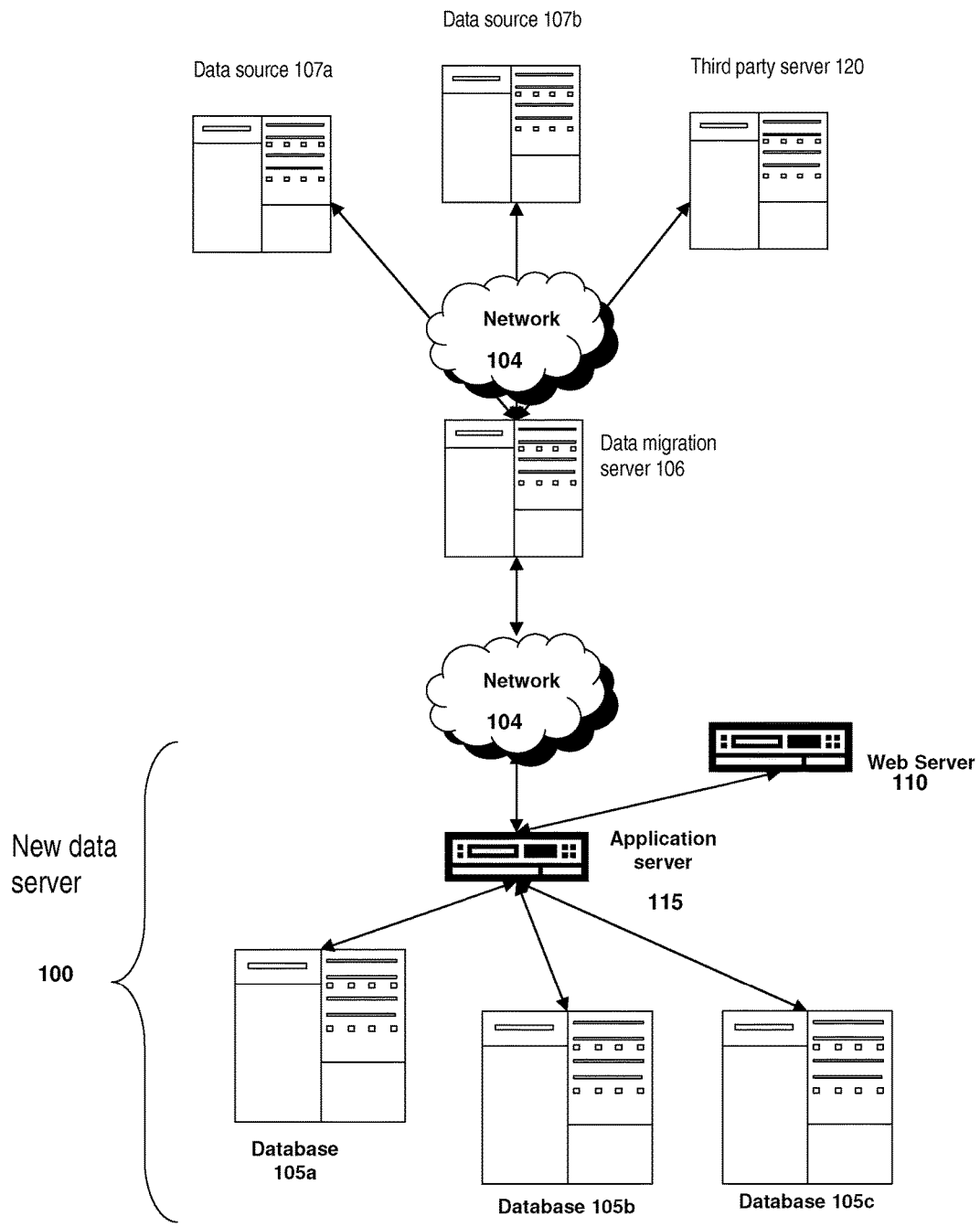
FIG. 1A is a block diagram of an embodiment of a system for migrating data from data sources to a new data server.

Referring now to FIG. 1A, a block diagram of an embodiment of a system for importing data from data sources over a network is shown. In brief overview, a number of data sources 107a, 107b (generally 107), are connected via a network 104a to a data migration server 106. The data migration server 106 is connected via a network 104b to a new data server 100. The new data server 100 may comprise a number of elements including a web server 110, an application server 115, and a number of databases 105a, 105b, 105c (generally 105). The data migration server 106 may communicate with the data sources 107 to migrate data from the data sources 107 to the new data server 100. The data migration server 106 may transform and repair data from the data sources 107 in the course of migration. The data migration server 106 may communicate with at least one third-party server 120 to retrieve information for repairing the data.

In some embodiments, some or all of the new data server elements may occupy the same physical machine, and may share any resources, including processors, memory, and communication links. In other embodiments, a new data server element may be distributed across multiple scalable, fault-tolerant, redundant machines. In some embodiments, these machines may be geographically distributed across a number of sites.

As shown, the data sources 107, data migration server 106, new data server 100, and third-party server 120 are connected to one another via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A data source 107 may be any source of data to migrate and/or incorporate into a new data server. A data source 107 may be a legacy data system, a data custodian, a third-party provider of data, a competitor data management system, a user's databases, or any combination thereof.

A data source 107 may comprise any server or servers capable of sending data. A data source 107 may send data according to any communication protocol for communicating with the data migration server 106. In some embodiments, a data source 107 may transmit data via a single uninterrupted transmission. In other embodiments, a data source 107 may transmit data in a predetermined number of stages. In various embodiments, a data source 107 may determine whether to transmit data via a single uninterrupted transmission or via stages according to any criteria. In one example, a data source 107 may transmit data according to an instruction from a data migration server 106. In another example, a data source 107a storing potentially duplicative data as another data source 107b may transmit data in stages so that the data migration server 106 may reconcile data received substantially in parallel from the data sources 107.

A data source 107 may transmit data in any form, using any means. In various embodiments, a data source 107 may transmit data as a direct data feed. In many embodiments, a data source 107 may transmit data in response to a poll from a data migration server 106. In further embodiments, a data source 107 may transmit data via remote job entry. In numerous embodiments, a data source 107 may transmit data via secured e-mail attachments. In many embodiments, a data source 107 may transmit data via XML transfer definition files. In various embodiments, a data source 107 may transmit data through any type of hosted service or products, such as VNC provided by RealVNC Ltd. of Cambridge, UK; GotoAssist® provided by Citrix Online Division, Inc. of Santa Barbara, Calif.; GotoMyPC® provided by Citrix Online Division, Inc. of Santa Barbara, Calif.; or WebEx™ provided by WebEx, Inc. of Santa Clara, Calif.

A data source 107 may include one or more databases for storing the data. A database may manage data, including without limitation addresses of properties, property descriptions, market rents, security deposit amounts, property sizes, management fees, and owners. A database used by a data source 107 may comprise any storage of data on any hardware and in any format. Databases may include, without limitation, flat file structures, SQL databases, object-oriented databases, and relational databases.

Still referring to FIG. 1A, a data migration server 106 may be used to migrate data from data sources 107 to the new data server 100. A data migration server 106 may retrieve or receive data from data sources 107. A data migration server 106 may sort the received data. A data migration server 106 may repair and/or transform received data in any manner and in any combination. In some embodiments, a data migration server 106 may repair and/or transform received data according to instructions from a data source 107, a new data server 100, or both. In other embodiments, a data migration server 106 may repair and/or transform according to data within the received data. In further embodiments, the data migration server 106 may communicate with one or more devices external to the servers 100 and 107 to receive instructions regarding data migration. Such devices may include, without limitation, external databases and other servers running data migration software.

Although FIG. 1A shows a data migration server 106 as a separate computing device, any and all functions of a data migration server 106 may be executed on any computing device, including without limitation any component or components of a new data server 100. In some embodiments, a data migration server 106 may execute on a network appliance. In other embodiments, a data migration server 106 may execute on a standalone server. In still other embodiments, a data migration server 106 may execute on a developer workstation. In some embodiments, the data migration server 106 may be deployed at the same site as the new data server 100. In some embodiments, the data migration server 106 may comprise an application which can be installed on any number of machines.

A new data server 100 may comprise any server or servers capable of receiving and storing data. A server 100 may receive data according to any communication protocol for communicating with the data migration server 106. In some embodiments, a new data server 100 may receive data via a single uninterrupted transmission. In other embodiments, a new data server 100 may receive data in a predetermined number of stages. In many embodiments, the new data server 100 may communicate with the data migration server 106 to determine whether the data will be received via a single uninterrupted transmission or via a predetermined number of stages.

A third party server 120 may comprise any server or servers capable of storing and transmitting data. A server 120 may receive requests for data from the data migration server 106 and transmit the requested data in response. In some embodiments, the server 120 may receive direct requests for data. In other embodiments, the server 120 may interpret the request to determine the appropriate data to transmit. For example, the server 120 may interpret a request including a street address and city as a request for the zip code corresponding to the location. The server 120 may access a database to retrieve the data to transmit to the data migration server 106. The server 120 may receive data according to any communication protocol for communicating with the data migration server 106.

Figure 1B:
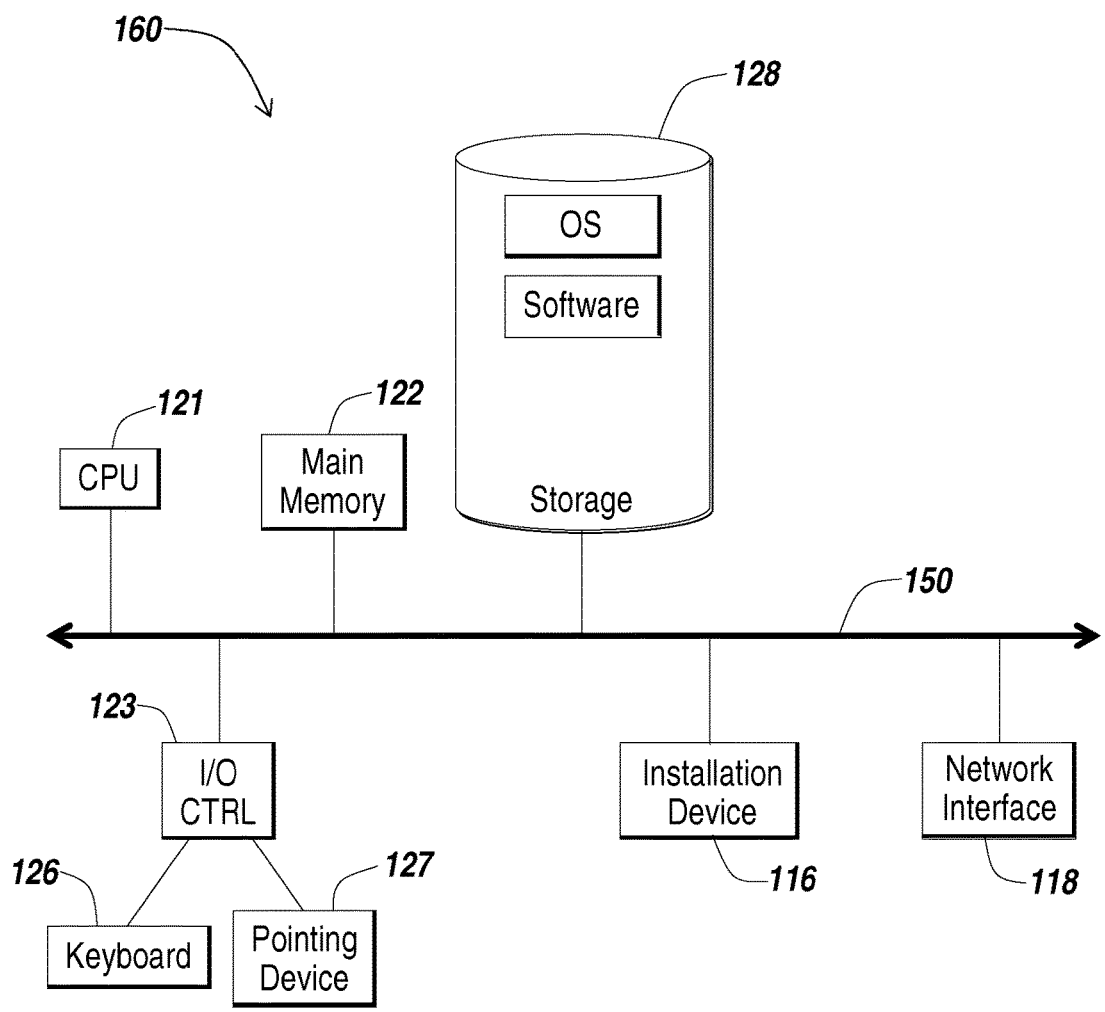
FIGS. 1B and 1C are block diagrams of example computing devices.
Figure 1C:
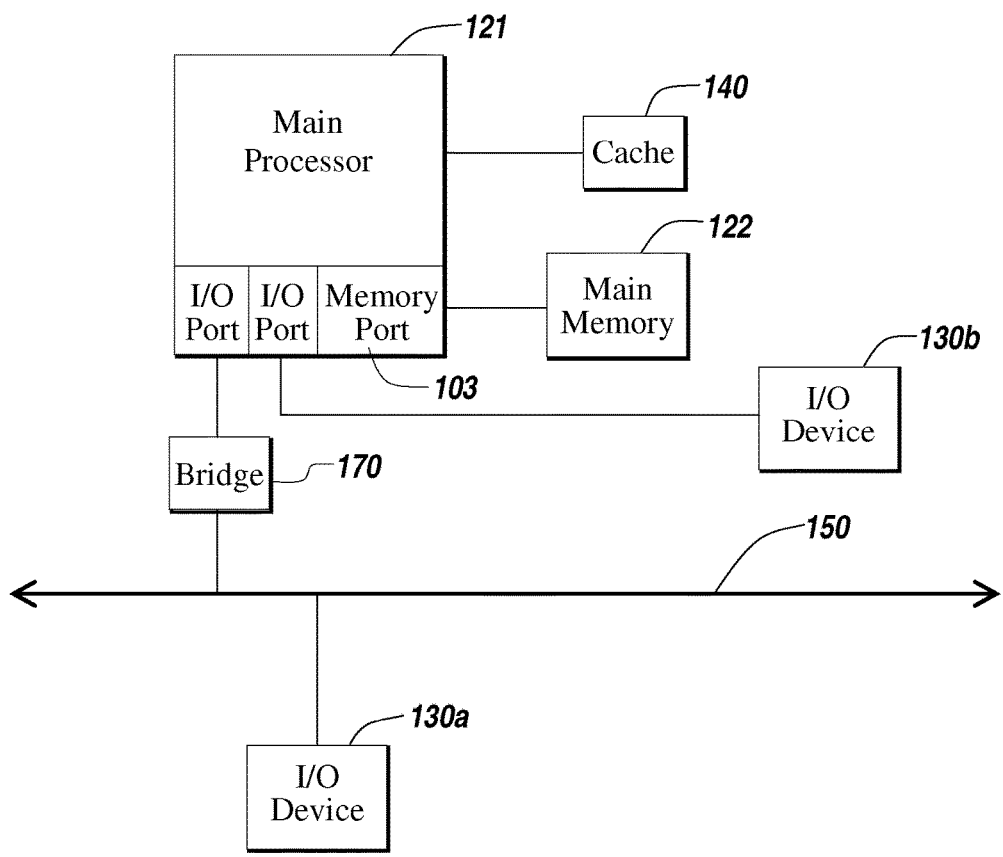

FIGS. 1B and 1C depict block diagrams of a computing device 160 useful for practicing an embodiment of a data migration server 106. As shown in FIGS. 1B and 1C, each computing device 160 includes a central processing unit 121, and a main memory unit 122. As shown in FIG. 1B, a computing device 160 may include a keyboard 126 and/or a pointing device 127, such as a mouse. As shown in FIG. 1C, each computing device 160 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif.

In various embodiments, the central processing unit 121 may comprise multiple processors and may provide functionality for simultaneous execution of instructions or for simultaneous execution of one instruction on more than one piece of data. In some embodiments, the central processing unit 121 may comprise a parallel processor with one or more cores. In one of these embodiments, the computing device 160 is a shared memory parallel device, with multiple processors and/or multiple processor cores, accessing all available memory as a single global address space. In another of these embodiments, the computing device 160 is a distributed memory parallel device with multiple processors each accessing local memory only. In still another of these embodiments, the computing device 160 has both some memory which is shared and some memory which can only be accessed by particular processors or subsets of processors. In still even another of these embodiments, the computing device 160, such as a multi-core microprocessor, combines two or more independent processors into a single package, often a single integrated circuit (IC).

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device. The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 160 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., HTTP, TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 communicates with other computing devices 160' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 160 of the sort depicted in FIGS. 1B and 1C typically operates under the control of operating systems, which control scheduling of tasks and access to system resources. The computing device 160 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 160 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 160 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

Figure 1D:
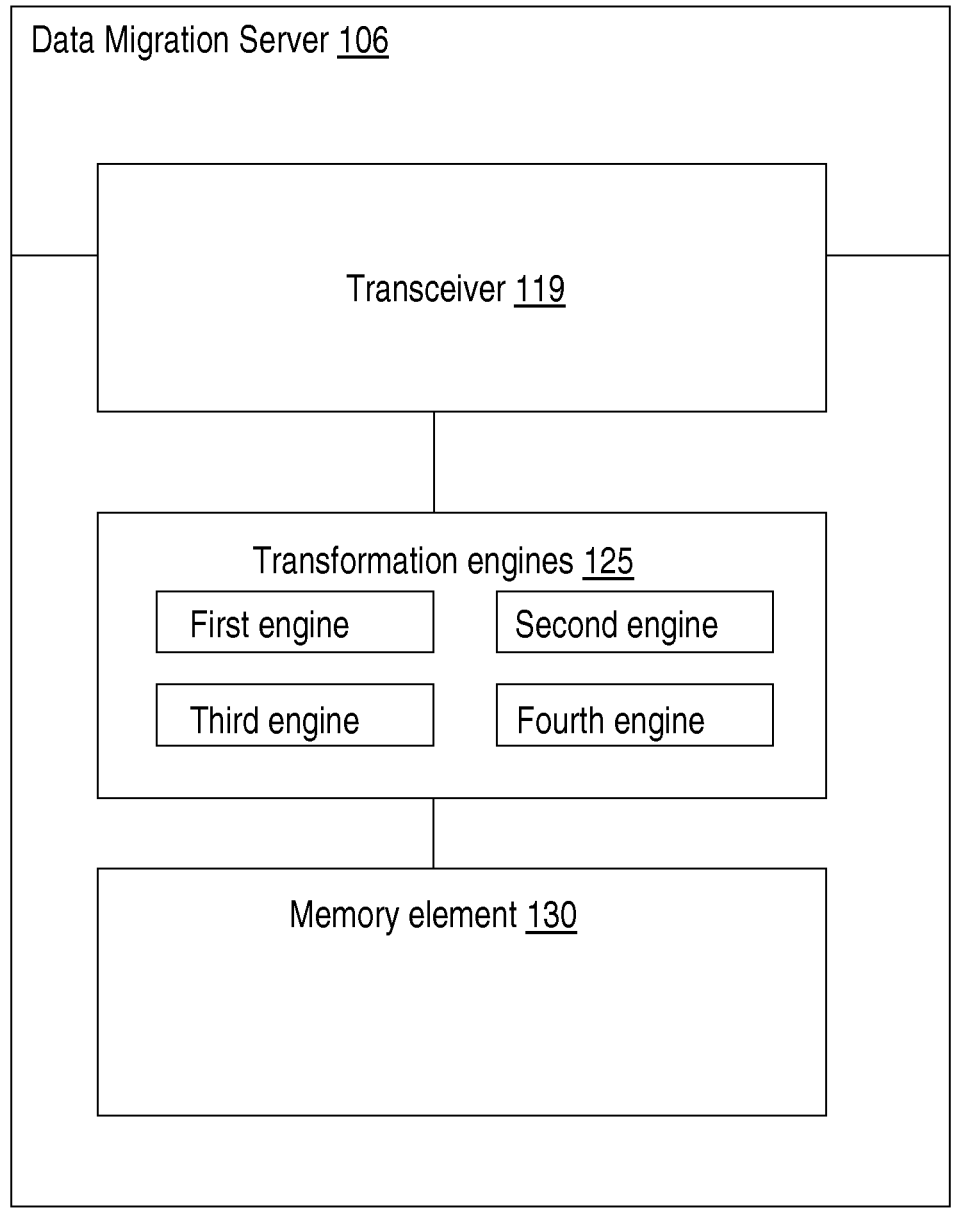
FIG. 1D is a block diagram of one example of a data migration server used in the system of FIG. 1A.

Referring now to FIG. 1D, a block diagram of an embodiment of a data migration server 106 is shown and described. In brief overview, the data migration server 106 includes a transceiver 119, a transformation engine 125, and a memory element 130. The data migration server 106 uses the transceiver 119 to communicate with the data sources 107 and the new data server 100. The transceiver 119 may receive data and/or instructions from the data sources 107 and the new data server 100. The transceiver may be a network interface 118, as described in reference to FIG. 1C.

The transformation engine 125 transforms data received from the data sources 107 before the data is transmitted to the new data server 100. The transformation engine 125 may repair the data, format the data, or both. Although this embodiment shows four transformation engines, the transformation engine 125 may include any number of engines performing any type of transformation in any combination. A transformation engine may comprise any program, application, process, task, thread, or set of executable instructions capable of performing any of the transformation described herein. In some embodiments, the transformation engine 125 includes a single engine running on a single processor of a central processing unit 121. When the data migration server 106 needs to perform a different transformation, the single processor executes the corresponding transformation engine.

In many embodiments, the transformation engine 125 includes multiple transformation engines running on multiple processors and/or multiple processor cores of the central processing unit 121. A separate processor or processor core may execute each transformation engine. In some embodiments, the number of types of transformations may exceed the number of processors or processor cores. The data migration server 106 may select a processor or processor core to execute a different transformation engine according to any criteria. For example, the server 106 may select the least-used processor or processor core. In another example, the server 106 may use a round-robin method for selecting the processor or processor core.

The memory element 130 may store the data received from the data sources 107. The memory element 130 may include a buffer that stores data for the transformation engine 125 to transform. The memory element 130 may be the main memory unit 122 or cache memory 140 described in FIG. 1B and FIG. 1C.

A data migration server 106 may be deployed as and/or executed on any type and form of computing device, such as a computer, network device or appliance capable of communicating on any type and form of network and performing the operations described herein.

Figure 2:
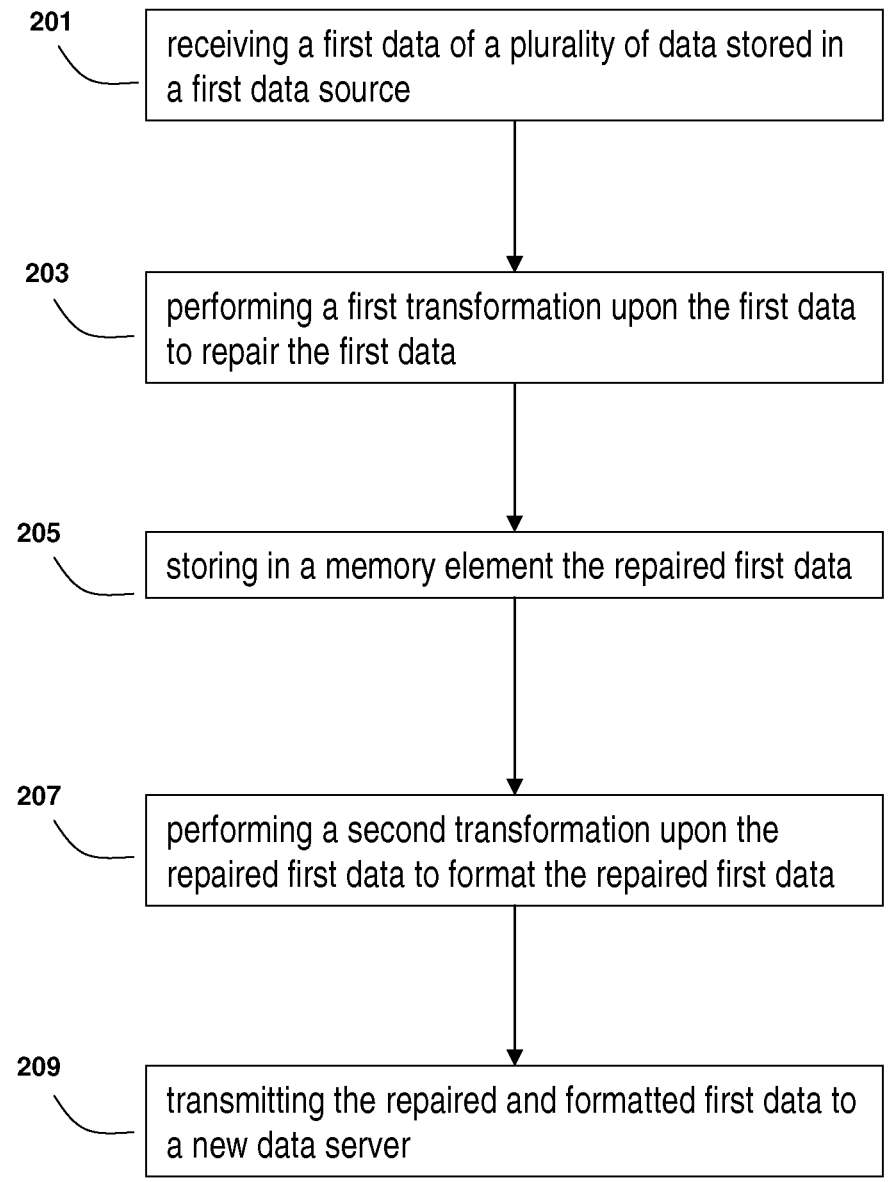
FIG. 2 is a flow diagram of a method for importing data from a data source over a network, including correction and transformation of the data.

Now referring to FIG. 2, a flow diagram illustrating a method for importing data from a data source over a network, including correction and transformation of the data, is shown. In brief overview, the method includes: receiving a first data of a plurality of data stored in a first data source (step 201); performing a first transformation upon the first data to repair the first data (step 203); storing in a memory element the repaired first data (step 205); performing a second transformation upon the repaired first data to format the repaired first data (step 207); and transmitting the repaired and formatted first data to a new data server (step 209). Although the method is described as being performed with a single process, it should be understood that the method may be performed with any number of processes working simultaneously and/or sequentially. In some examples, while the data migration server 106 is performing a first transformation upon data to repair the data, the server 106 may also be receiving further data from the first data source and/or data from other data sources. The data migration server 106 may simultaneously perform different first transformations upon different data to repair the data. The data migration server 106 may simultaneously perform a first transformation upon data to repair the data while performing a second transformation upon already repaired data to format the already repaired data. Other examples of simultaneous and/or sequential processes according to the method would be apparent to one of ordinary skill in the art.

Still referring to FIG. 2, now in greater detail, a data migration server 106 may receive a first data of a plurality of data stored in a first data source 107a. The server 106 may receive the first data via a direct data feed, a poll to a data source, a remote job entry, or a secured e-mail attachment. The server 106 may receive the first data through any protocol, including specialized protocols. In some embodiments, the server 106 may receive the first data as part of a single uninterrupted transmission of the plurality of data. The server 106 may receive the first data substantially simultaneously with other data from the first data source 107a. In other embodiments, the server 106 may receive the first data in one of a plurality of stages of transmitting data.

The server 106 may sort the first data. In one example, the server 106 may determine a category associated with the first data. The server 106 may store the first data in the memory element 130 according to the category. The server 106 may determine that the first data belongs to a group of data. In these embodiments, the server 106 may determine that the first data shall not be transmitted to the new data server 100 until the server 106 has received, repaired, and/or transformed all the data in the group, and the server 106 may then transmit the group of data. In some embodiments, the server 106 may perform any of the aforementioned on the first data and other received data substantially simultaneously.

After receiving a first data of a plurality of data stored in a first data source 107a, the transformation engine 125 of the data migration server 106 may perform a first transformation to repair the first data. In some embodiments, the server 106 may determine the first transformation according to data received prior to the transmission of the first data. For example, the server 106 may receive from a data source 107 information indicating the type of repairs to perform prior to the transmission of the plurality of data. In another example, the server 106 may receive the identity of the data source 107a and determine the types of repairs to perform based on the data source 107a via a look-up table, by way of example. In additional embodiments, the server 106 may determine the first transformation according to data received concurrently with the first data. In some embodiments, the data may be located in a predetermined field of a packet that also contains the first data. In other embodiments, the data may be located in a predetermined packet among the packets transmitted to the data migration server 106. The data may indicate the types of repairs to perform or the identity of the data source from which the types of repairs to perform may be determined.

In various embodiments, the server 106 may determine the first transformation according to a set of rules. For example, if the first data is a transaction from an accounting system, the server 106 may determine the first transformation according to the type of corruption of the transaction. For an orphan transaction, the server 106 may use a first transformation that creates one or more transactions to balance out the orphan. The created transactions may be flagged for further review by an administrator of the data migration server 106 or new data server 106. The server 106 may store the orphan transaction in the memory element 130 and wait for complementary transactions from the first data source 107a before migrating the transactions to the new data server 106. For data that has merged transactions, the server 106 use a first transformation to split the information into separate transactions.

Upon determining the types of repairs to perform, the transformation engine 125 may select a first transformation engine for repairing the first data. In some embodiments, the transformation engine 125 selects the first engine from among a plurality of engines. In other embodiments, the engine 125 configures an engine according to the determined transformation. The first transformation may repair the first data in any manner. In some embodiments, the first transformation may determine if the first data should be discarded. In other embodiments, the first transformation may parse the first data and discard part of the first data. In other embodiments, the first transformation may verify the accuracy of the first data and correct inaccurate data. The first transformation may retrieve information from a third-party server 120 and compare the information to the first data. In some embodiments, the first transformation may repair the first data by replacing it with information retrieved from the third-party server.

In various embodiments, the first transformation may perform a calculation using the first data to verify its accuracy. The first transformation may also use other data received from the data source 107 in the calculation. In response to a determination that the first data is inaccurate, the first transformation may perform a calculation upon the first data and other data received from the data source 107 to correct the first data. The first transformation may also perform the calculation using data received from a different data source 107 than the server 107 that sent the first data. In many embodiments, the transformation engine 125 may store the first data in the memory element 130 until the engine 125 receives the additional data to perform the calculation.

In some examples, the first transformation may identify relationships between the first data and other data. The first transformation may add information regarding the relationships to the first data. For example, properties such as apartments and condos may be interrelated because they occupy the same building and/or have the same owner. However, some data management server providers may not create or store records in a manner that links the related properties. Therefore, when the records are migrated to another data server, the records may be separated or processed in a manner that obscures the relationships between the properties. The first transformation may search through received data to identify a relationship between the first data and other data. For example, the first transformation may identify other data whose street numbers, addresses, cities, and zip codes match those of the first data. The first transformation may compare the property owner with that of other received data. Based on the results of the comparisons, the first transformation may identify data that the first data should be grouped with. The first transformation may create any indicators of the grouping. For example, the first transformation may add to the first data pointers to other members of the group. In another example, the first transformation may add to the first data a field with a value held in common by other members of the group.

In more examples, the first transformation may resolve duplicate accounting entries. For example, the first transformation may compare the general ledger (GL) code for the first data with the general ledger (GL) code for other received data. If the first transformation finds data with matching GL codes, the first transformation may determine if the data has duplicate information. If the first data duplicates previously received data, the first transformation may discard the first data. If the first data contains different information, the first transformation may resolve the GL code to another code and continue migrating the first data.

After performing a first transformation upon the first data to repair the first data, the data migration server 106 may store the repaired first data in a memory element 130. In some embodiments, the repaired first data is stored in a buffer for further transformation. In other embodiments, the repaired first data is stored for use in calculations to verify and correct other data from the first data source 107. In many embodiments, the repaired first data is stored until the data migration server 106 receives other data in a group of data, and the server 106 transmits the group to the new data server 100. Other repaired data may be stored in the same memory element 130 as the repaired first data. While the repaired first data is thus stored, the server 106 may continue to receive additional data from the first data source, perform first transformations upon other data, and/or retrieve other repaired data from the memory element 130 for the second transformation. The server 106 may retrieved the repaired first data from the memory element 130 at any later time for further processing.

After storing the repaired first data in the memory element, the data migration server 106 may perform a second transformation upon the repaired first data to format the repaired first data. In some embodiments, the second transformation converts the repaired first data from the first data source's 107a format to the new data server 100's format. In other embodiments, the second transformation converts the repaired first data from the first data source's 107a format to an intermediate format, also referred to herein as a neutral format.

In various embodiments, the server 106 may determine the second transformation according to a set of rules. For example, if the first data is an address, the server 106 may determine the second transformation that parses the first data according to the number of fields. In another example, if the first data is a name, the server 106 may select the second transformation that parses data to extract first, middle, and last names of individuals or company information.

In some embodiments, the server 106 may determine the second transformation according to data received prior to the transmission of the first data. For example, the server 106 may receive from a first data source 107a information indicating the identities of the data source 107a and new data server 100 to determine the transformation for formatting the repaired first data. In another example, the server 106 may receive the identity of the first data source 107a and an instruction to convert the first data from the first data source's format into an intermediate format. In additional embodiments, the server 106 may determine the second transformation according to data received concurrently with the first data. In some embodiments, the data may be located in a predetermined field of a packet that also contains the first data. In other embodiments, the data may be located in a predetermined packet among the packets transmitted to the data migration server 106. The data may indicate the identities of the first data source 107a and the new data server 100 or the identity of the first data source 107a and an instruction to convert the first data from the data source's format into the intermediate format.

In various embodiments, the second transformation may parse an address to obtain the information in the fields. The second transformation may arrange the information according to the format of the new data server 100. For example, when the first data has four lines, the second transformation may determine that the first line contains an address, the second line is an optional address line, the third line contains the city and state, and the fourth line contains the zip code. If the second line is blank, the second transformation may ignore the blank line. The second transformation may process the first line to obtain a street number, street address, and/or unit number, the third line to obtain the city and state of the address, and the fourth line to obtain the zip code. The second transformation may arrange the information to format the address according to the new data server 100.

In many embodiments, the second transformation may parse a name to determine the components of the name and the associated type of party. For example, if the name is a single word, the second transformation may determine that the party is a company. If the name is multiple words and the last word is "Inc.," "Ltd.," "LLP," and so forth, the second transformation may determine that the party is a company. If the name is two words, the second transformation may determine if the name belongs to an individual. The first word may be obtained as the individual's first name and the second word as the surname. In some embodiments, the name is three words with the second word being a middle name or initial.

Upon determining the type of transformation to perform, the transformation engine 125 may select a second transformation engine for formatting the repaired first data. In some embodiments, the transformation engine 125 selects the second engine from among a plurality of engines. In other embodiments, the engine 125 configures an engine according to the determined transformation.

After performing a second transformation upon the repaired first data to format the repaired first data, the data migration server 106 may transmit the repaired and formatted first data to the new data server 100. The data migration server 106 may send the repaired and formatted first data to the new data server 100 via the transceiver 119. The data migration server 106 may send the repaired and formatted first data through any protocols, including one or more specialized protocols. In some embodiments, the server 106 determines the identity of the new data server 100 according to information sent from the first data source 107a prior to transmission of the first data. In other embodiments, the server 106 determines the new system 100 according to data received concurrently with the first data, either in a predetermined field of a packet that also contains the first data or in a predetermined packet among the packets received by the server 106. In more embodiments, the server 106 sends all of its received data to the new system 100.

Figure 3:
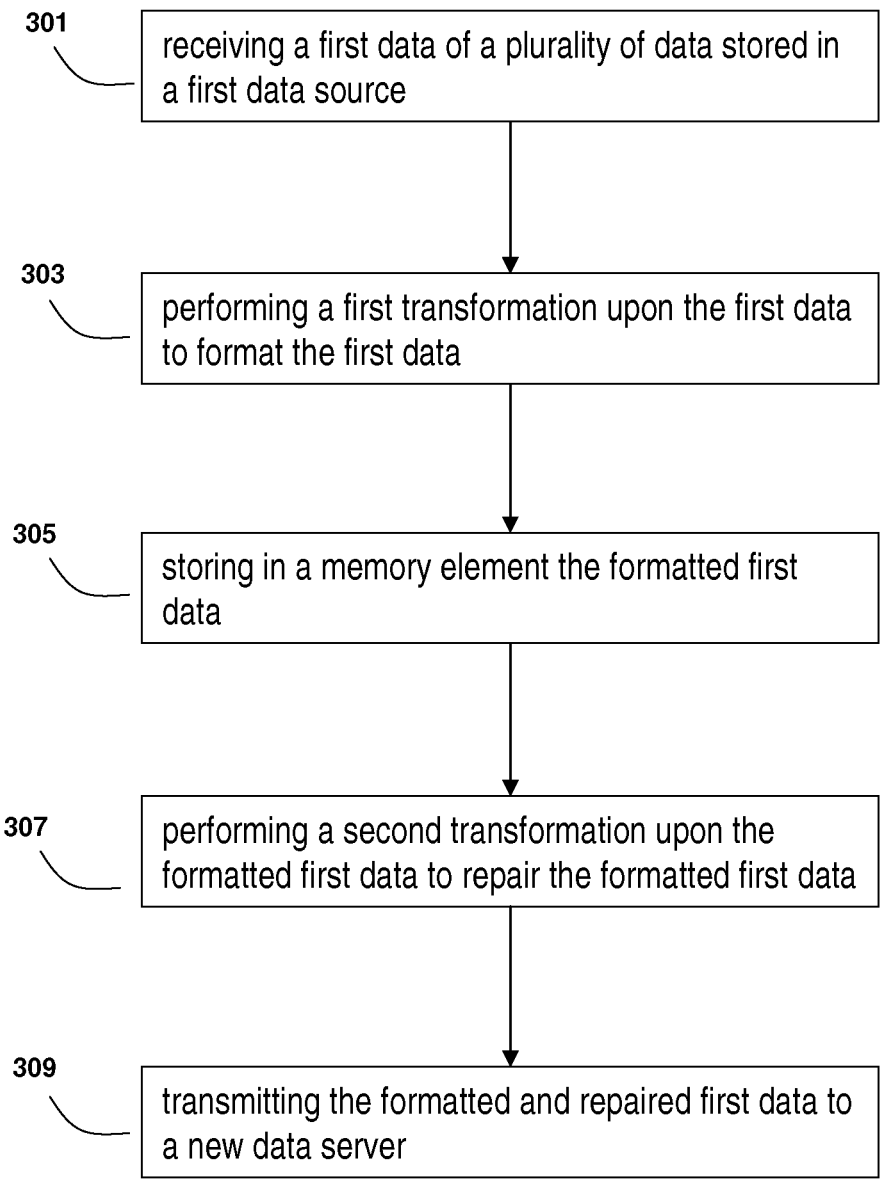
FIG. 3 is a flow diagram of another method for importing data from a data source over a network, including correction and transformation of the data.

Now referring to FIG. 3, a flow diagram illustrating a second method for importing data from a data source over a network, including correction and transformation of the data is shown. In brief overview, the method includes: receiving a first data of a plurality of data stored in a first data source (step 301); performing a first transformation upon the first data to format the first data (step 303); storing in a memory element the formatted first data (step 305); performing a second transformation upon the formatted first data to repair the formatted first data (step 307); and transmitting the formatted and repaired first data to a new data server (step 309). Although the method is described as being performed with a single process, it should be understood that the method may be performed with any number of processes working simultaneously and/or sequentially, as understood in reference to the examples of FIG. 2 and as would be appreciated by one of ordinary skill in the art.

Still referring to FIG. 3, now in greater detail, a data migration server 106 may receive a first data of a plurality of data stored in a first data source 107a. The server 106 may receive the first data according to any of the forms or methods described in reference to FIG. 2. The server 106 may receive the first data substantially simultaneously with other data from the first data source 107a. The server 106 may perform any operation on the first data and other received data substantially simultaneously.

After receiving a first data of a plurality of data stored in a first data source 107a, the data migration server 106 may perform a first transformation upon the first data to format the first data. In some embodiments, the first transformation converts the first data from the data source's 107a format to the new data server's 100 format. In other embodiments, the first transformation converts the first data from the data source's 107a format to an intermediate format, also referred to herein as a neutral format.

In some embodiments, the server 106 may determine the first transformation according to data received prior to the transmission of the first data. For example, the server 106 may receive from a first data source 107a information indicating the identities of the first data source 107a and new server 100 to determine the transformation for formatting the first data. In another example, the server 106 may receive the identity of the first data source 107a and an instruction to convert the first data from the data source's format into an intermediate format. In additional embodiments, the server 106 may determine the first transformation according to data received concurrently with the first data. In some embodiments, the data may be located in a predetermined field of a packet that also contains the first data. In other embodiments, the data may be located in a predetermined packet among the packets transmitted to the data migration server 106. The data may indicate the identities of the first data source 107a and the new system 100 or the identity of the first data source 107a and an instruction to convert the first data from the first data source's format into the intermediate format.

Upon determining the type of transformation to perform, the transformation engine 125 may select a first transformation engine for formatting the first data. In some embodiments, the transformation engine 125 selects the first engine from among a plurality of engines. In other embodiments, the engine 125 configures an engine according to the determined transformation.

After performing a first transformation upon the first data to format the first data, the data migration server 106 may store the formatted first data in a memory element 130. In some embodiments, the formatted first data is stored in a buffer for further transformation. In other embodiments, the formatted first data is stored for use in calculations to verify and correct other data from the data source 107. In many embodiments, the formatted first data is stored until the data migration server 106 receives other data in a group of data, and the server 107 transmits the group to the new data server 100. Other formatted data may be stored in the same memory element 130 as the formatted first data. While the formatted first data is thus stored, the server 106 may continue to receive additional data from the data source, perform first transformations upon other data, and/or retrieve other formatted data from the memory element 130 for the second transformation. The server 106 may retrieved the formatted first data from the memory element 130 at any later time for further processing.

After storing the formatted first data in the memory element, the transformation engine 125 of the data migration server 106 may perform a second transformation upon the formatted first data to repair the first data. In some embodiments, the server 106 may determine the second transformation according to data received prior to the transmission of the first data. For example, the server 106 may receive from a first data source 107a information indicating the type of repairs to perform, prior to the transmission of the plurality of data. In another example, the server 106 may receive the identity of the first data source 107a and determine the types of repairs to perform based on the first data source 107a via a look-up table, by way of example. In additional embodiments, the server 106 may determine the second transformation according to data received concurrently with the first data. In some embodiments, the data may be located in a predetermined field of a packet that also contains the first data. In other embodiments, the data may be located in a predetermined packet among the packets transmitted to the data migration server 106. The data may indicate the types of repairs to perform or the identity of the first data source 107a from which the types of repairs to perform may be determined.

Upon determining the types of repairs to perform, the transformation engine 125 may select a second transformation engine for repairing the formatted first data. In some embodiments, the transformation engine 125 selects the second engine from among a plurality of engines. In other embodiments, the engine 125 configures an engine according to the determined transformation. The second transformation may repair the formatted first data in any manner. In some embodiments, the second transformation may determine if the formatted first data should be discarded. In other embodiments, the second transformation may parse the formatted first data and discard part of the first data. In other embodiments, the second transformation may verify the accuracy of the first data and correct inaccurate data. The second transformation may retrieve information from a third-party server 120 and compare the information to the first data. In some embodiments, the second transformation may repair the formatted first data by replacing it with information retrieved from the third-party server.

In various embodiments, the second transformation may perform a calculation using the formatted first data to verify its accuracy. The second transformation may also use other data received from the data source 107 in the calculation. In response to a determination that the formatted first data is inaccurate, the second transformation may perform a calculation upon the formatted first data and other data received from the data source 107 to correct the formatted first data. The second transformation may also perform the calculation using data received from a different data source 107b than the data source 107a that sent the first data. In many embodiments, the transformation engine 125 may store the first data in the memory element 130 until the engine 125 receives the additional data to perform the calculation.

After performing a second transformation upon the formatted first data to repair the formatted first data, the data migration server 106 may transmit the formatted and repaired first data to the new data server 100. The data migration server 106 may send the formatted and repaired first data to the new data server 100 via the transceiver 119. The data migration server 106 may send the formatted and repaired first data through any protocols, including one or more specialized protocols. In some embodiments, the server 106 determines the identity of the new data server 100 according to information sent from the first data source 107 prior to transmission of the first data. In other embodiments, the server 106 determines the new system according to data received concurrently with the first data, either in a predetermined field of a packet that also contains the first data or in a predetermined packet among the packets received by the server 106.

Figure 4:
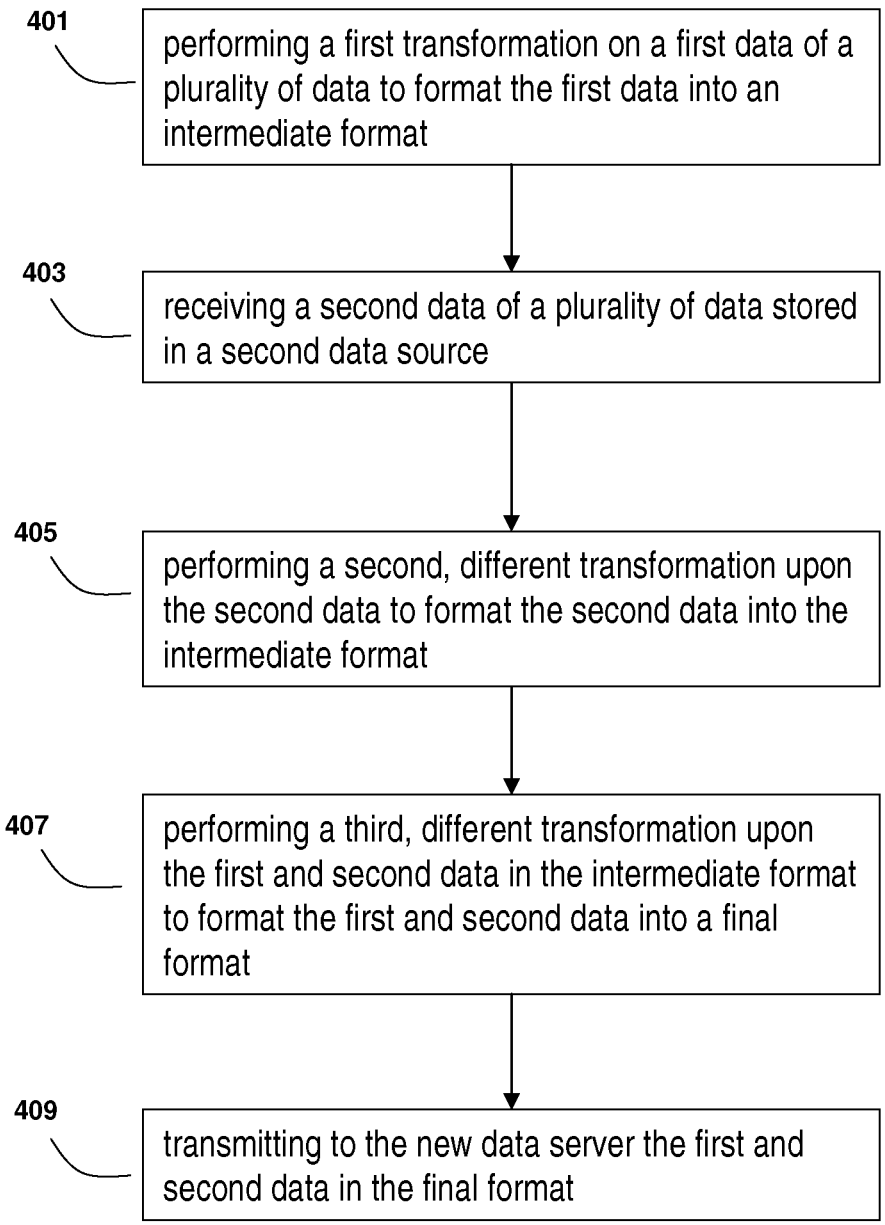
FIG. 4 is a flow diagram of a method for importing data from at least two data sources with different formats over a network.

Now referring to FIG. 4, a flow diagram illustrating a method for importing data from at least two data sources with different formats over a network is shown. In brief overview, the method includes: performing a first transformation on a first data of a plurality of data to format the first data into an intermediate format (step 401); receiving a second data of a plurality of data stored in a second data source (step 403); performing a second, different transformation upon the second data to format the second data into the intermediate format (step 405); performing a third, different transformation upon the first and second data in the intermediate format to format the first and second data into a final format (step 407); transmitting to the new data server the first and second data in the final format (step 409). Although the method is described as being performed with a single process, it should be understood that the method may be performed with any number of processes working simultaneously and/or sequentially.

Still referring to FIG. 4, now in greater detail, a data migration server 106 may perform a first transformation on a first data of a plurality of data to format the first data into an intermediate format. The server 106 may determine that the first data shall be converted into an intermediate format based on any criteria. The server 106 may convert all data from a predetermined first data source 107*a* into an intermediate format. In some embodiments, the server 106 may be programmed to convert any data from predetermined sources into the intermediate format. The server 106 may identify the predetermined sources by their Internet Protocol (IP) addresses, by way of example. The server 106 may store the types of transformations needed to convert data from each predetermined source into the intermediate format.

In other embodiments, the server 106 may receive instructions from the first data source 107*a* indicating that data the first data source 107*a* transmits shall be converted into the intermediate format. The instructions may indicate the type of transformation that converts the first data. The instructions may include the identity of the first data source 107*a*, and the server 106 may determine the transformation from the identity. In some of these embodiments, the instructions may indicate that only data sent during predetermined times should be converted. In one example, the instructions may specify the sessions when transmitted data should be converted into the intermediate format. In another example, the instructions may specify the number of packets following the instructions that include data to convert into the intermediate format.

The server 106 may convert data from various data sources or data from the same data source into different intermediate formats. Each intermediate format may correspond to a different type of data. For example, the server 106 may have an intermediate format for properties, an intermediate format for transactions, and an intermediate format for addresses. The server 106 may determine whether to convert data into an intermediate format and the type of transformation for such conversion according to any method described herein and any method that would be appreciated by one of ordinary skill in the art.

Upon determining the type of transformation to perform, the transformation engine 125 may select a first transformation engine for formatting the first data. In some embodiments, the transformation engine 125 selects the first engine from among a plurality of engines. In other embodiments, the engine 125 configures an engine according to the determined transformation.

After performing a first transformation on a first data of a plurality of data to format the first data into an intermediate format, the data migration server 106 may receive a second data of a plurality of data stored in a second data source 107*b* and perform a second, different transformation upon the second data. The second transformation may convert the second data into the intermediate format. The data migration server 106 may receive the second data and determine whether and how the second data shall be converted into the intermediate format according to any of the methods described in reference to FIGS. 2 and 3. In some embodiments, the second data source 107*b* may be a different server than the first data source 107*a*. In other embodiments, the same data source 107 may transmit the first and second data to the data migration server 106. In these embodiments, the data source 107 transmits additional data indicating that the first and second data have different formats. The additional data may identify the formats of the first and second data. The data migration server 106 may determine that different transformations are needed to transform the first and second data into the intermediate format.

Upon determining the type of transformation to perform, the transformation engine 125 may select a second transformation engine for formatting the second data. In some embodiments, the transformation engine 125 selects the second engine from among a plurality of engines. In other embodiments, the engine 125 configures an engine according to the determined transformation.

In various embodiments, the intermediate format may include fields across all types of the data. The intermediate format may include fields common to the types of data and fields specific to each type. Data converted into the intermediate format may include blank fields, where inapplicable to the data. In some embodiments, a transformation engine may insert default values in fields of the intermediate format.

In some examples, an intermediate format for transactions may include fields across all types of transactions, such as payor/payee or creditor/debtor, account number, and amount. The intermediate format may also include fields specific to particular types of transactions. For example, the intermediate format may include an invoice number for account statements, a financial account number for transactions that credit accounts, and individual penalty fees for charges to a tenant. When the server 106 receives an account statement, a transformation engine may parse the statement to obtain the creditor, debtor, account number, amount, and invoice number and insert the information into the intermediate format. The transformation may leave the fields such as the financial account number and penalty fees blank. When the server 106 receives a transaction crediting an account, the transformation engine may parse the transaction to obtain the creditor, debtor, account number, amount, and invoice number and insert the information into the intermediate format. The transformation may leave the fields such as the invoice number and individual penalty fees blank. When the server 106 receives a transaction charging penalty fees to a tenant, the transformation engine may parse the transaction to obtain the creditor, debtor, account number, amount, and individual penalty fees into the intermediate format. The transformation may leave the fields such as the invoice number and financial account number blank.

In more examples, an intermediate format may include fields across all properties, such as street address, city, state, zip code, rental rate, number of bedrooms, number of bathrooms, and type of property. The intermediate format may include fields specific to some data sources, but not others. For example, the intermediate format may include fields for the property owner or owners, the percentage of the property owned by each owner, the bank associated with the mortgage on the property, and dates when rents are due. The transformation engine may detect that a single party owns the property and indicate in the intermediate format that the party owns 100%. If the date when rents are due is missing, the transformation engine may set the first of each month as the default date. The transformation engine may supply the name of a bank associated with the mortgage if the property owner always uses that bank.

After receiving a second data of a plurality of data stored in a second data source 107b and performing a second, different transformation upon the second data, the data migration server 106 may perform a third, different transformation upon the first and second data in the intermediate format to format the first and second data into a final format. For example, the data migration server may perform a transformation upon all the data formatted into the intermediate format for properties to create data formatted for the new data server 100.

In some embodiments, the server 106 may perform a third, different transformation upon the first data in the intermediate format to format the first data into a first final format and a fourth, different transformation upon the second data in the intermediate format to format the second data into a second final format. For example, the server 106 may perform one transformation upon account statements in the intermediate format, another transformation upon transactions that credit accounts in the intermediate format, and yet another transformation upon charges to a tenant in the intermediate format. The transformations may format the data into specific transactions for the new data server 100.

Any of the final formats described herein may correspond to a format of the new data server 100. The data migration server 106 may determine the final format according to the identity of the new data server 100 and/or the type of data. The transformation engine 125 may select a transformation engine for converting the first and second data from the intermediate format to the final format. In some embodiments, the transformation engine 125 selects the engine from among a plurality of engines. In other embodiments, the engine 125 configures an engine according to the determined transformation.

After performing a third, different transformation upon the first and second data in the intermediate format to format the first and second data into a final format, the data migration server 106 may transmit to the new data server 100 the first and second data in the final format or formats. The data migration server 106 may send the first and second data in the final format to the new data server 100 via the transceiver 119. The data migration server 106 may send the first and second data in the final format through any protocols, including one or more specialized protocols. In some embodiments, the server 106 determines the identity of the new data server 100 according to information sent from the data sources 107 prior to transmission of the first and second data. In other embodiments, the server 106 determines the new system 100 according to data received concurrently with the first or second data, either in a predetermined field of a packet that also contains the first or second data or in a predetermined packet among the packets received by the server 106. In more embodiments, the server 106 sends all of its received data to the new data server 100.

Figure 5:
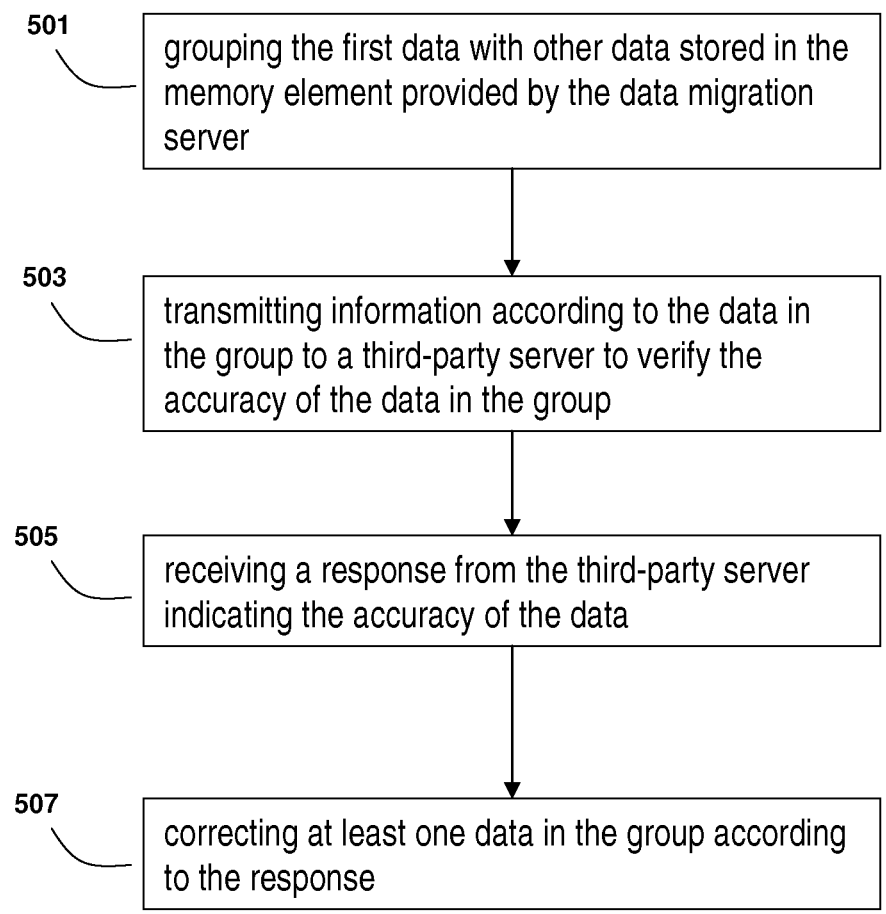
FIG. 5 is a flow diagram of a method for verifying the accuracy of data imported from data sources over a network using third-party systems.

Now referring to FIG. 5, a flow diagram illustrating a method for verifying the accuracy of data imported from data sources over a network using third-party systems is shown. In brief overview, the method includes: grouping the first data with other data stored in the memory element provided by the data migration server (step 501); transmitting information according to the data in the group to a third-party server to verify the accuracy of the data in the group (step 503); receiving a response from the third-party server indicating the accuracy of the data (step 505); and correcting at least one data in the group according to the response (step 507).

Still referring to FIG. 5, now in greater detail, a data migration server 106 may group the first data with other data stored in the memory element 130 provided by the server. The server 106 may group the data in a manner that enables the individual data to be verified by a third-party system 120. In one example, the server 106 may group a zip code with a street address, city, and state. In another example, the server 106 may group an insurance policy expiration date with the name of an insurance company and an identifier of an insurance policy. In yet another example, the server 106 may group an advertised rental price with an identifier of a real estate vacancy posting and a third-party system 120 hosting the postings.

After grouping the first data with other data stored in the memory element provided by the server, the server 106 may transmit information according to the data in the group to a third-party server to verify the accuracy of the data in the group. The server 106 may process the data in the group to determine the third-party server and the information to transmit. For example, the server 106 may determine that a street address, city, and state should be transmitted to a server with a database of addresses to verify the zip code. In another example, the server 106 may determine that an identifier of an insurance policy should be transmitted to a server with a database of policies for the identified insurance company to verify the expiration date of the policy. In yet another example, the server 106 may determine that an identifier of a real estate vacancy posting should be transmitted to the third-party server hosting the postings to verify the advertised rental price of a property.

After transmitting information according to the data in the group to a third-party server to verify the accuracy of the data in the group, the server 106 may receive a response from the third-party server indicating the accuracy of the data. The server 106 may determine if data in the group needs correcting by comparing the received response with the data. In some embodiments, the server 106 may determine that data is accurate because the received response matches data in the group. In other embodiments, the server 106 may determine that data is inaccurate because the received response and data do not match, or the server 106 receives an error message from the third-party server.

The system may address inaccurate data through various methods. In some embodiments, the server 106 may overwrite the inaccurate data with data in the response from the third-party server. The third-party server may process information according to the data in the group from the server 106 to determine that at least one data in the group is inaccurate. The third-party server may correct the inaccurate data according to any data correction algorithm. For example, the third-party server may perform a spell-checking algorithm upon the inaccurate data to determine a correct spelling. In another example, the third-party server may look up an address in a database to extract a missing, corresponding zip code. The third-party server may transmit the correct data to the server 106, which the server 106 may use to overwrite the inaccurate data.

In many embodiments, the server 106 may determine data is inaccurate because the third-party server transmits an error message. In one example, the street address may be misspelled, resulting in a third-party server's inability to recognize the address. In another example, an insurance policy may be outdated and therefore, non-existent in an insurance company's database server. In yet another example, a real estate vacancy posting on a third-party system may have already expired after a predetermined period of time, and the third-party system may have removed the posting from its databases.

In some of these embodiments, the data migration server 106 may select a data correction algorithm and correct inaccurate data according to the received error message. For example, upon receiving an error regarding a street address, the server 106 may run a spell-checking algorithm upon the street address. The server 106 may resubmit the corrected address to a third-party server for verification. In other examples, upon receiving an error that information could not be found, the server 106 may delete the inaccurate data. The server 106 may delete an insurance policy in response to an error message indicating the policy cannot be located in an insurance company's database server. The server 106 may delete a real estate vacancy posting in response to an error message from a listing server indicating the posting has expired.

In further embodiments, when the server 106 receives error messages from third-party servers, the server 106 may save the errors to a log file. Such a log file may contain the error message, the groupings of data, the information transmitted to the third-party servers 120, the time of transmission, the identities of the third-party servers 120, or any other information or combination thereof. This log file may then be sent to and reviewed by an administrator of the data migration server 106 or an administrator of the new data server 106. In other embodiments, the server 106 may alert an administrator to a potential data error by any other means, including without limitation an e-mail, a web page, or an instant message. In some embodiments, the server 106 may alert an administrator to potential data errors as they occur. In other embodiments, the server 106 may generate a report of potential data errors periodically.

Figure 6:
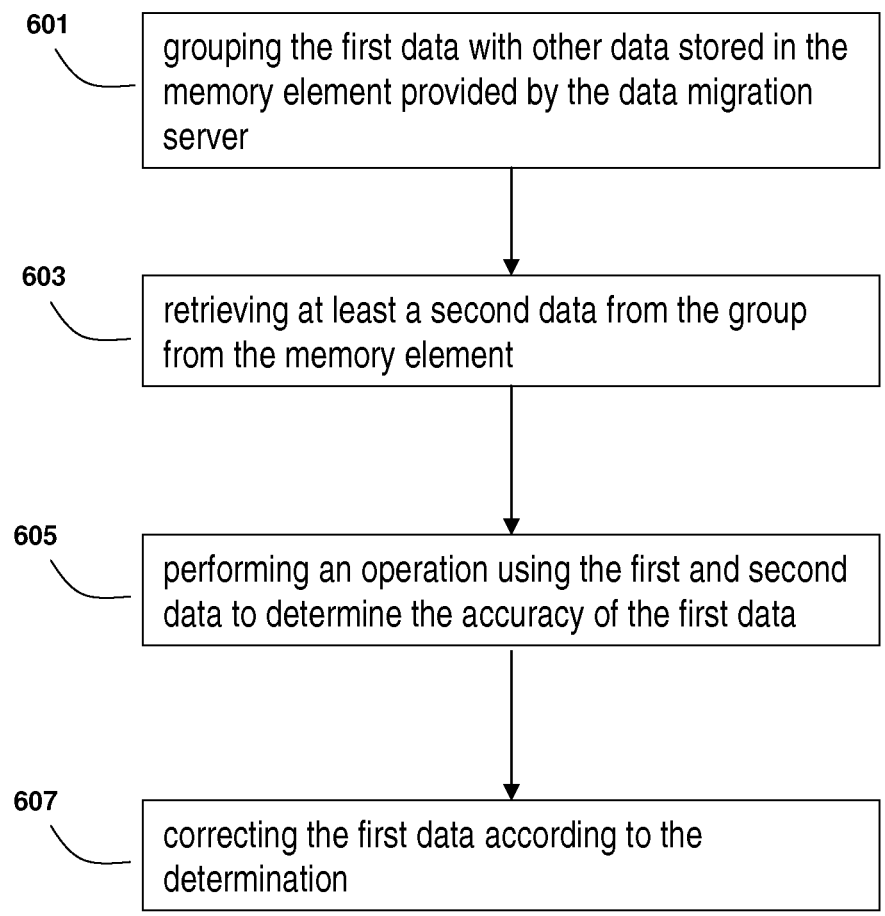
FIG. 6 is a flow diagram of a method for verifying internally the accuracy of data imported from data sources over a network.

Now referring to FIG. 6, a flow diagram illustrating a method for verifying internally the accuracy of data imported from data sources over a network is shown. In brief overview, the method includes: grouping the first data with other data stored in the memory element provided by the data migration server (step 601); retrieving at least a second data from the group from the memory element (step 603); performing an operation using the first and second data to determine the accuracy of the first data (step 605); and correcting the first data according to the determination (step 607).

Still referring to FIG. 6, now in greater detail, a data migration server 106 may group the first data with other data stored in the memory element provided by the server. The server 106 may group the data in a manner that enables the first data to be verified according to the other data in the group. In one example, the server 106 may group a management fee for a property with the street address, type of property, and owner of the property. In another example, the server 106 may group the end of the tax year for a property with the type of property. In yet another example, the server 106 may group the price per square foot of the property with the market price and size of the property.

After grouping the first data with other data stored in the memory element provided by the server, the server 106 may retrieve at least a second data from the group from the memory element. In some examples, the server 106 may retrieve a street address, type of property, and owner of the property for the management fee, the type of property for the end of the tax year for the property, and the market price and size of the property for the price per square foot of the property.

After retrieving at least a second data from the group from the memory element, the server 106 may perform an operation upon the data to determine the accuracy of the first data and correct the first data according to the determination. In many embodiments, the server 106 may determine the operation according to a policy, a set of rules, look-up table, or any other means. The operation may be performed using a global set of rules or a set of rules specific to a data source 107, a new data server 100, or both. In some embodiments, the server 106 may apply a management fee policy to a property using the street address, owner of the property, and type of property to determine the management fee. The server 106 may compare the result of the policy to the management fee and correct the fee if the fee does not match the result. In other embodiments, the server 106 may apply a rule to a type of property to determine the end of the tax year for the property. The server 106 may correct the date if the date does not match the rule. In further embodiments, the server 106 may divide the size of the property by the market price. If the stored price per square foot of the property does not match the calculated quotient, the server 106 may correct the price per square foot accordingly. In many embodiments, the server 106 may store the corrected result in the memory 130. In various embodiments, the server 106 may transmit the corrected result to the new data server 100.

While the invention has been particularly shown and described with reference to specific preferred embodiments, it should be understood by those skilled in the art that various changes in form and detail may be made therein without departing from the spirit and scope of the invention as defined by the appended claims.

What is claimed:

1. A method of repairing and migrating data from a data source over a network, the method comprising:
   receiving, by a server, a first data of a plurality of data stored in a first data source;
   identifying, by the server, a relationship between the first data and one or more additional data received from one or more additional data sources;
   grouping, by the server, based on the relationship, the first data and the one or more additional data;
   adding, by the server, to the first data, an indicator of the grouping;
   performing, by the server, a first transformation upon the first data to repair the first data based on at least one of the additional data in the grouping;
   storing, in a memory element provided by the server, the repaired first data;
   performing, by the server, a second transformation upon the repaired first data to format the repaired first data; and
   transmitting, by the server, the repaired and formatted first data to a new data server.

2. The method of claim 1, wherein the first and second transformations are determined according to a set of rules and wherein a type of repair performed in the first transformation is determined from a plurality of repair types.

3. The method of claim 1, wherein the second transformation formats the repaired first data into an intermediate format.

4. The method of claim 3, further comprising:
receiving, by the server, a second data of a plurality of data stored in a second data source;
performing, by the server, a third transformation different from the second transformation upon the second data to format the second data into the intermediate format.

5. The method of claim 4, further comprising:
performing, by the server, a fourth transformation upon the first and second data in the intermediate format to format the first and second data into a final format; and
storing, in the memory element provided by the server, the first and second data in the final format.

6. The method of claim 1, further comprising:
transmitting, by the server, information according to the data in the group to a second server to verify the accuracy of the data in the group;
receiving, by the server, a response from the second server indicating the accuracy of the data; and
correcting, by the server, at least one data in the group according to the response.

7. The method of claim 1, further comprising:
retrieving, by the server, a second data from the plurality of data that is stored in the first data source;
performing, by the server, an operation upon the first and second data to determine the accuracy of the first data; and
correcting, by the server, the first data according to the determination.

8. The method of claim 1, wherein adding the indicator of the grouping comprises adding, to the first data, a field with a value held in common by other members of the grouping.

9. A method of repairing and migrating data from a data source over a network, the method comprising:
receiving, by a server, a first data of a plurality of data stored in a data source;
performing, by the server, a first transformation upon the first data to format the first data;
storing, in a memory element provided by the server, the formatted first data;
identifying, by the server, a relationship between the formatted first data and one or more additional data received from one or more additional data sources;
grouping, by the server, based on the relationship, the formatted first data and the one or more additional data;
adding, by the server, to the formatted first data, an indicator of the grouping;
performing, by the server, a second transformation upon the formatted first data to repair the formatted first data based on at least one of the additional data in the grouping; and
transmitting, by the server, the formatted and repaired first data to a new data server.

10. The method of claim 9, wherein the first and second transformations are determined according to a set of rules and wherein a type of repair performed in the second transformation is determined from a plurality of repair types.

11. The method of claim 9, wherein the first transformation formats the first data into an intermediate format.

12. The method of claim 11, further comprising:
receiving, by the server, a second data of a plurality of data stored in a second data source;
performing, by the server, a third transformation different from the first transformation upon the second data to format the second data into the intermediate format.

13. The method of claim 12, further comprising:
performing, by the server, a fourth transformation upon the first and second data in the intermediate format to format the first and second data into a final format; and
storing, in the memory element provided by the server, the first and second data in the final format.

14. The method of claim 9, further comprising:
transmitting, by the server, information according to the data in the group to a second server to verify the accuracy of the data in the group;
receiving, by the server, a response from the second server indicating the accuracy of the data; and
correcting, by the server, at least one data in the group according to the response.

15. The method of claim 9, further comprising:
retrieving, by the server, a second data from the plurality of data that is stored in the first data source;
performing, by the server, an operation upon the first and second data to determine the accuracy of the first data; and
correcting, by the server, the first data according to the determination.

16. The method of claim 9, wherein adding the indicator of the grouping comprises adding, to the first data, a field with a value held in common by other members of the grouping.

17. A computer implemented system for repairing and migrating data from a data source over a network, the system comprising:
a transceiver that receives a first data of a plurality of data stored in a data source and transmits repaired and formatted first data to a new data server;
a first transformation engine that performs a first transformation upon the first data to repair the first data, the first transformation comprising:
identifying a relationship between the first data and one or more additional data received from one or more additional data sources,
grouping, based on the relationship, the first data and the one or more additional data,
adding, to the first data, an indicator of the grouping, and
repairing the first data based on at least one of the additional data in the grouping;
a second transformation engine that performs a second transformation upon the repaired first data to format the repaired first data; and
a memory element that stores the repaired first data or the repaired and formatted first data.

18. The system of claim 17, wherein the second transformation formats the repaired first data into an intermediate format.

19. The system of claim 18, further comprising a third transformation engine that performs a third transformation different from the second transformation upon second data from a second data source to format the second data into the intermediate format.

20. The system of claim 19, further comprising a fourth transformation engine that performs a fourth transformation upon the first and second data in the intermediate format to format the first and second data into a final format, wherein the first and second data in the final format are stored in the memory element.

21. The system of claim 17, further comprising a processor that transmits information according to the data in the group to a server to verify the accuracy of the data in the group, receives a response from the second server indicating the accuracy of the data and corrects at least one data in the group according to the response.

22. The system of claim 17, further comprising a processor that retrieves a second data from the plurality of data that is stored in the first data source, performs an operation upon the first and second data to determine the accuracy of the first data, and corrects the first data according to the determination.

23. The computer implemented system of claim 17, wherein adding the indicator of the grouping comprises adding, to the first data, a field with a value held in common by other members of the grouping.

24. A computer implemented system for repairing and migrating data from a data source over a network, the system comprising:
 a transceiver that receives a first data of a plurality of data stored in a data source and transmits formatted and repaired first data to a new data server;
 a first transformation engine that performs a first transformation upon the first data to format the first data;
 a second transformation engine that performs a second transformation upon the formatted first data to repair the formatted first data, the second transformation comprising:
  identifying a relationship between the formatted first data and one or more additional data received from one or more additional data sources,
  grouping, based on the relationship, the formatted first data and the one or more additional data,
  adding, to the formatted first data, an indicator of the grouping, and
  repairing the formatted first data based on at least one of the additional data in the grouping; and
 a memory element that stores the formatted first data or the formatted and repaired first data.

25. The system of claim 24, wherein the first transformation formats the first data into an intermediate format.

26. The system of claim 25, further comprising a third transformation engine that performs a third transformation different from the first transformation upon second data from a second data source to format the second data into the intermediate format.

27. The system of claim 26, further comprising a fourth transformation engine that performs a fourth transformation upon the first and second data in the intermediate format to format the first and second data into a final format, wherein the first and second data in the final format are stored in the memory element.

28. The system of claim 24, further comprising a processor that transmits information according to the data in the group to a server to verify the accuracy of the data in the group, receives a response from the second server indicating the accuracy of the data and corrects at least one data in the group according to the response.

29. The system of claim 24, further comprising a processor that retrieves a second data from the plurality of data that is stored in the first data source, performs an operation upon the first and second data to determine the accuracy of the first data, and corrects the first data according to the determination.

30. The computer implemented system of claim 24, wherein adding the indicator of the grouping comprises adding, to the first data, a field with a value held in common by other members of the grouping.

\* \* \* \* \*